(12) United States Patent
Grewell et al.

(10) Patent No.: US 6,385,613 B1
(45) Date of Patent: May 7, 2002

(54) RESOURCE MANAGEMENT USING RESOURCE DOMAINS

(75) Inventors: Patricia Grewell, San Mateo; Terry N. Hayes, Los Altos; William Bridge, Alameda, all of CA (US); Hans Karten, Ermelo (NL)

(73) Assignee: Oracle Corporation, Redwood Shores, CA (US)

( * ) Notice: Subject to any disclaimer, the term of this patent is extended or adjusted under 35 U.S.C. 154(b) by 0 days.

(21) Appl. No.: 09/272,980

(22) Filed: Mar. 19, 1999

Related U.S. Application Data

(62) Division of application No. 08/672,348, filed on Jun. 25, 1996, now Pat. No. 5,920,872.

(51) Int. Cl.[7] .............................................. G06F 17/30
(52) U.S. Cl. ........................... 707/8; 707/202; 707/205
(58) Field of Search ............................... 707/8, 10, 202, 707/205, 204

(56) References Cited

U.S. PATENT DOCUMENTS

| | | | |
|---|---|---|---|
| 5,161,227 A | | 11/1992 | Dias et al. |
| 5,226,143 A | * | 7/1993 | Baird et al. .................... 707/8 |
| 5,251,318 A | * | 10/1993 | Nitta et al. ................... 707/10 |
| 5,403,639 A | | 4/1995 | Belsan et al. |
| 5,423,044 A | * | 6/1995 | Sutton et al. .................. 707/8 |
| 5,515,537 A | * | 5/1996 | Tavares et al. ............... 707/10 |
| 5,537,645 A | * | 7/1996 | Henson et al. ................. 707/8 |
| 5,551,046 A | * | 8/1996 | Mohan et al. .................. 707/8 |
| 5,596,754 A | * | 1/1997 | Lomet .......................... 707/8 |
| 5,615,373 A | * | 3/1997 | Ho .............................. 707/10 |
| 5,682,537 A | * | 10/1997 | Davies et al. .................. 707/8 |
| 5,920,872 A | * | 7/1999 | Grewell et al. ............. 707/202 |

OTHER PUBLICATIONS

*A Distributed Lock Manager on Fault Tolerant MPP,* Aldred, M.; Gertner, I.; McKellars, S. (Encore Comput. Corp.), 1995.

\* cited by examiner

*Primary Examiner*—Thomas G. Black
*Assistant Examiner*—Frantz Coby
(74) *Attorney, Agent, or Firm*—Hickman Palermo Truong & Becker LLP; Brian D. Hickman; Carl L. Brandt

(57) ABSTRACT

A method and apparatus for managing access to resources is provided. When a process requires access to a resource, the process requests a lock on the resource from a lock manager unit that resides on the same node as the process. If a resource object for the resource does not exists, one is created in the lock manager unit, but not on lock manager units on other nodes. Because each lock manager unit does not have to store all resource objects, and resource objects are only created for resources that are actually used, the overhead of the lock management system is significantly reduced. Resources are grouped in recovery domains. When a lock manager unit that supported a recovery domain fails, the recovery domain is marked invalid. All resources in the recovery domain are considered invalid unless it would have been impossible for a failed instance to have held an exclusive lock on the resource. A snapshot of lock information is made before cleanup is performed on invalid resources. After cleanup, the snapshot is used to determine which resources were cleaned up.

28 Claims, 7 Drawing Sheets

RESOURCE MANAGEMENT USING RESOURCE DOMAINS

This application is a divisional of application Ser. No. 08/672,348, filed Jun. 25, 1996 and now U.S. Pat. No. 5,920,872.

FIELD OF THE INVENTION

The present invention relates to distributed lock management systems, and more specifically, to resource management techniques for distributed lock management systems.

BACKGROUND OF THE INVENTION

In typical database systems, users store, update and retrieve information by submitting commands to a database application. To be correctly processed, the commands must comply with the database language that is supported by the database application. One popular database language is known as Structured Query Language (SQL).

A logical unit of work that is comprised of one or more database language statements is referred to as a transaction. In a database server, a memory area called the System Global Area (SGA) is allocated and one or more processes are started to execute one or more transactions. The combination of the SGA and the processes executing transactions is called a database instance.

Database instances use resources while executing transactions. Even though resources may be shared between database instances, many resources may not be accessed in certain ways by more than one process at any given time. For example, resources such as data blocks of a storage medium or tables stored on a storage medium may be concurrently accessed in some ways (e.g. read) by multiple processes, but accessed in other ways (e.g. written to) by only one process at a time. Consequently, mechanisms have been developed which control access to resources.

One such mechanism is referred to as a lock. A lock is a data structure that indicates that a particular process has been granted certain rights with respect to a resource. There are many types of locks. Some types of locks may be shared on the same resource by many processes, while other types of locks prevent any other locks to be granted on the same resource.

The entity responsible for granting locks on resources is referred to as a lock manager. In a single node database system, a lock manager will typically consist of one or more processes on the node. In a multiple-node system, such as a multi-processing machine or a local area network, a lock manager may include processes distributed over numerous nodes. A lock manager that includes components that reside on two or more nodes is referred to as a distributed lock manager.

FIG. 1 is a block diagram of a multiple-node computer system 100. Each node has stored therein a database instance and a portion of a distributed lock management system 132. Specifically, the illustrated system includes three nodes 102, 112 and 122 on which reside database instances 104, 114 and 124, respectively, and lock manager units 106, 116 and 126, respectively. Database instances 104, 114 and 124 have access to the same database 120. The database 120 resides on a disk 118 that contains multiple blocks of data. Disk 118 generally represents one or more persistent storage devices which may be on any number of machines, including but not limited to the machines that contain nodes 102, 112 and 122.

A communication mechanism allows processes on nodes 102, 112, and 122 to communicate with each other and with the disks that contain portions of database 120. The specific communication mechanism between the nodes and disk 118 will vary based on the nature of system 100. For example, if the nodes 102, 112 and 122 correspond to workstations on a network, the communication mechanism will be different than if the nodes 102, 112 and 122 correspond to clusters of processors and memory within a multi-processing machine.

Before any of database instances 104, 114 and 124 can access a resource shared with the other database instances, it must obtain the appropriate lock on the resource from the distributed lock management system 132. Such a resource may be, for example, one or more blocks of disk 118 on which data from database 120 is stored.

Lock management system 132 stores data structures that indicate the locks held by database instances 104, 114 and 124 on the resources shared by the database instances. If one instance requests a lock on a resource while another instance has a lock on the resource, the distributed lock management system 132 must determine whether the requested lock is consistent with the granted lock. If the requested lock is not consistent with the granted lock, then the requester must wait until the instance holding the granted lock releases the granted lock.

According to one approach, lock management system 132 maintains one master resource object for every resource managed by lock management system 132, and includes one lock manager unit for each node that contains a database instance. The master resource object for a particular resource stores (1) an indication of all locks that have been granted on or requested for the particular resource, and (2) a VALID flag for the resource.

The master resource object for each resource resides within only one of the lock manager units 106, 116 and 126. For each resource, the lock manager units that do not manage the master resource store data that indicates (1) the name of the resource, (2) data indicating which lock manager unit maintains the master resource object of the resource, (3) a VALID flag for the resource, and (4) the lock held on the resource by the database instance that is associated with the lock manager unit.

For example, assume that three resources (R1, R2 and R3) exist in database system 100, and that the master resource objects for R1, R2 and R3 are stored in lock manager units 106, 106 and 126, respectively. Assume also that database instance 104 has been granted an exclusive mode lock on resource R1 and a shared mode lock on resource R2. Database instance 114 has been granted a shared mode lock on resource R2. Database instance 124 does not hold any shared or exclusive mode locks. FIG. 2A illustrates the information maintained in each of the lock manager units 106, 116 and 126 under these conditions.

Various types of failures may occur in a database system, including node failure and instance failure. When a database instance fails, the current state of and all data structures in the failed database instance are lost. When a node fails, all information stored in the volatile memory of the node is lost, including the current state of and all data structures in any instance that resides on the node and any portion of the distributed lock manager that resides on the node. Thus, if node 102 failed, the current state of and all data structures in both lock manager unit 106 and database instance 104 will be lost.

When a database instance fails, either pursuant to an instance failure or a node failure, a cleanup operation must be performed on the resources on which the failed instance held any type of exclusive lock. Other database instances are allowed to access those resources only after the appropriate cleanup operations are performed. All of the exclusive mode locks held by a failed instance can easily be identified if all portions of the distributed lock management system 132 continue to operate after the failure of the instance. However, instance recovery becomes more difficult if a portion of the distributed lock management system 132 also fails.

For example, assume that node 102 fails. With the failure of node 102, lock manager unit 106 and database instance 104 will crash. All of the information maintained within lock manager unit 106 will be lost. Potentially, the lost information includes many or all of the exclusive mode locks granted to database instance 104. Under the conditions illustrated in FIG. 2A, the master resource objects for R1 and R2 would be lost with the failure of node 102.

Based on the information that remains in lock manager units 116 and 126, it is possible to determine some information about the locks that were held by database instance 104 when database instance 104 failed. For example, the remaining lock manager units 116 and 126 may maintain the master resource objects of some of the locks that were held by database instance 104. In the illustrated example, lock manager unit 126 manages the master resource object for resource R3, and therefore knows that database instance 104 owned a null mode lock on R3. Consequently, cleanup does not have to be performed on R3. If database instance 104 held an exclusive mode lock on R3, then the lock manager unit 126 would mark R3 as "invalid".

In addition to managing some of the locks held by database instance 104, lock manager units 116 and 126 may contain information that may be used to determine that database instance 104 could not have owned exclusive locks on particular resources. For example, lock manager unit 116 stores data that indicates that database instance 114 has a shared mode lock on resource R2. A shared lock is incompatible with an exclusive mode lock, so it can be concluded that database instance 104 did not have an exclusive mode lock on resource R2. Consequently, no cleanup must be performed on resource R2.

Using the techniques described above, it is possible to determine that some resources must be cleaned up before a subsequent access, and that other resources do not have to be cleaned up before a subsequent access. However, there may be a large number of resources for which it is not possible to determine whether a cleanup is necessary. For example, based on the information contained in lock manager units 116 and 126, it is not possible to determine whether database instance 104 had an exclusive mode lock on resource R1. Resources that fall into this category are also marked "invalid".

Specifically, when a node fails, each surviving lock manager unit sets to FALSE the VALID flag of each resource on which the failed instance held or may have held an exclusive mode lock. The distributed lock management system 132 does not grant any requests on resources that are marked invalid. Once cleanup has been performed on a resource, each lock manager unit sets the VALID flag for the resource back to TRUE, and the distributed lock management system 132 can grant locks on the resource.

Thus, after the failure of node 102, lock manager units 116 and 126 set the VALID flag associated with resource R1 to FALSE. While the VALID flag remains FALSE, lock management system 132 does not grant any locks on resource R1. As part of the cleanup of R1, a new master resource object for R1 is created and any locks on R1 held by the surviving database instances are placed on the new master resource object. When the cleanup operation for R1 has been completed, lock manager units 116 and 126 set the VALID flag associated with resource R1 to TRUE. After lock manager units 116 and 126 have set the VALID flag of R1 to TRUE, lock management system 132 may once again grant locks on resource R1.

FIG. 2B illustrates lock manager units 116 and 126 after the failure of node 102. With the failure of node 102, the master resource objects for resources R1 and R2 are lost. In FIG. 2B, master resource objects for resources R1 and R2 have been recreated within lock manager unit 116. The master resource object for resource R1 has been marked invalid because it is not possible to determine whether instance 104 held an exclusive mode lock on resource R1. The master resource object for resource R2 is marked valid because the shared lock on resource R2 held by instance 114 would have prevented instance 104 from having an exclusive lock on resource R2.

A significant problem with the recovery technique described above is that every lock manager unit must store data for every resource. Consequently, each new resource used by any instance in the system increases the size of every lock manager unit within the system. In large systems that use small granularity locks, each lock manager unit within distributed lock management system 132 may have to store data for millions of resources, whether or not the resources are ever used by any process in the system. Consequently, the total overhead required by the distributed lock manager becomes enormous.

However, if each lock manager unit does not store information about each resource in the system, it is possible for a lock manager unit to grant a lock that should not be granted. For example, assume that lock manager units 116 and 126 did not store any lock information for resource R2. After the crash of lock manager unit 106, there is no indication that a master resource object had ever been created for R2. Consequently, if one of the remaining lock manager units 116 and 126 received a lock request for R2, the lock manager unit would simply create a master resource object for R2 and grant the requested lock. The process to which the lock was granted would then have access to potentially invalid data stored in R2.

Based on the foregoing, it is desirable to provide a distributed lock management system in which each lock manager unit does not have to store information about every resource in the system. It is further desirable to provide a distributed lock management system in which lock manager units will not grant locks on resources that are in invalid states even though the lock manager units do not have prior knowledge of the resource.

SUMMARY OF THE INVENTION

A method and apparatus for managing access to resources is provided. According to one aspect of the invention, a distributed lock management system only creates a resource object for a resource when a database instance requires access to the resource. In addition, every database instance does not hold a lock on every resource. Consequently, the lock management overhead is significantly reduced.

When a process requires access to a resource, the process sends a lock request to the lock management system. The lock manager unit assigned to master the resource determines whether a resource object for the resource already exists. If a resource object for the resource does not exist, one is created in the master lock manager unit, but not necessarily on any lock manager units on other nodes.

Resources are grouped into recovery domains. When a lock manager unit that supported a recovery domain fails, the recovery domain is marked invalid. All resources in the invalid recovery domain are considered invalid unless it would have been impossible for a failed instance to have held an exclusive lock on the resource.

A snapshot of lock information is made before cleanup is performed on invalid resources. After cleanup, the snapshot is used to determine which resources were cleaned up. According to one embodiment of the invention, the cleanup process is sent a snapshot identifier before beginning cleanup operations. After completing cleanup operations, the cleanup process sends the snapshot identifier back to the lock management system. The lock management system then uses the snapshot identified by the snapshot identifier to determine which resources were cleaned up by the cleanup process.

BRIEF DESCRIPTION OF THE DRAWINGS

The present invention is illustrated by way of example, and not by way of limitation, in the figures of the accompanying drawings and in which like reference numerals refer to similar elements and in which:

FIG. 4 is a flow chart illustrating steps performed by the lock management system of FIG. 3 in response to the failure of a node;

DETAILED DESCRIPTION OF THE PREFERRED EMBODIMENT

A method and apparatus for managing locks on resources in a database system is described. In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

Figure 3:
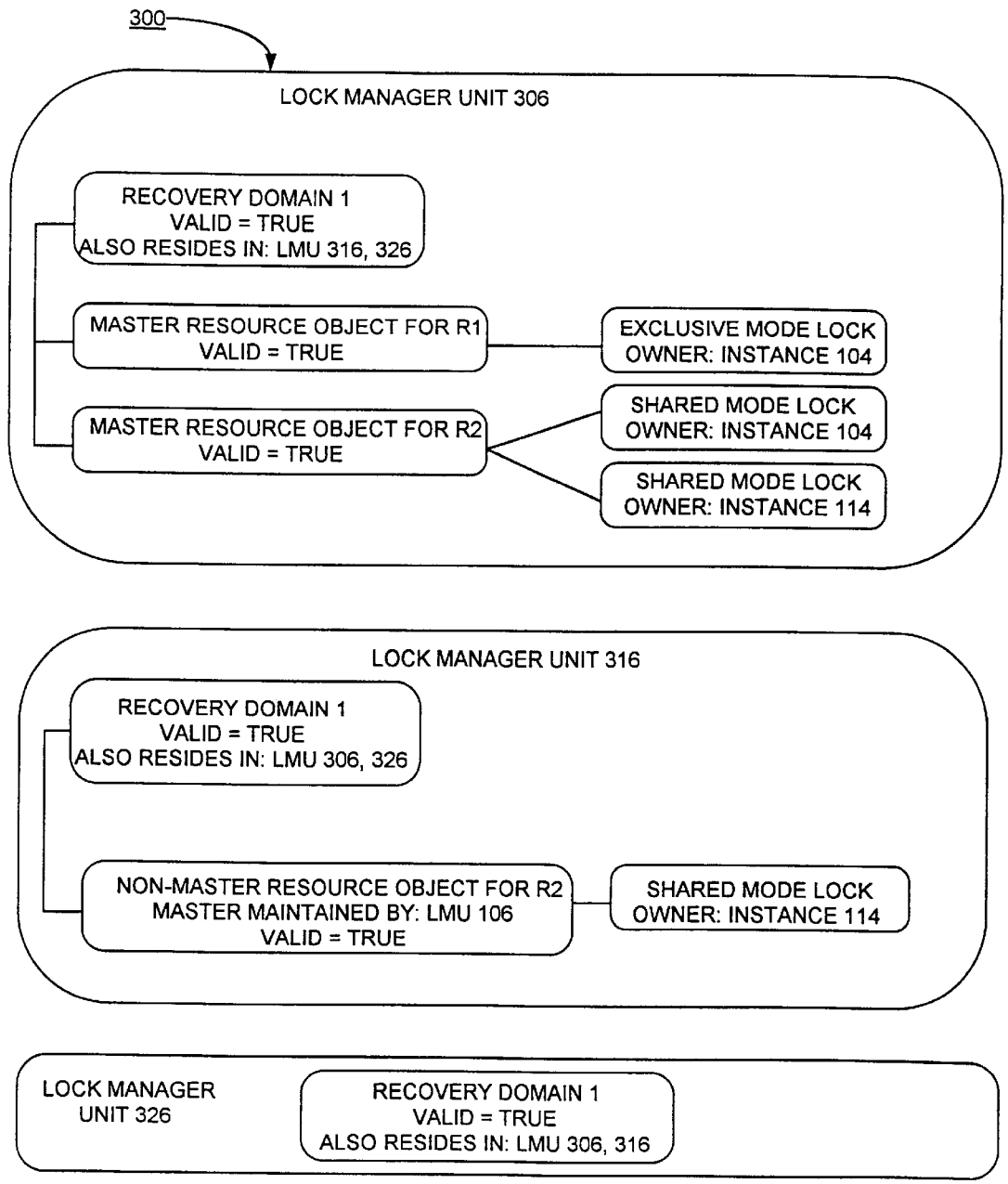
FIG. 3 is a block diagram of a lock management system according to an embodiment of the invention.

FIG. 3 illustrates a distributed lock management system 300 according to one embodiment of the invention. Distributed lock management system 300 includes three lock manager units 306, 316 and 326. For the purpose of explanation, it shall be assumed that lock manager units 306, 316 and 326 reside on nodes 102, 112 and 122, respectively. It shall also be assumed that database instances 104, 114 and 124 hold the same locks on the same resources as in the example described above. Specifically, database instance holds an exclusive lock on a resource R1 and a shared mode lock on a resource R2. Database instance 114 holds a shared mode lock on resource R2. Database instance 124 does not currently hold any locks.

AS-NEEDED RESOURCE OBJECT CREATION

Figure 1:
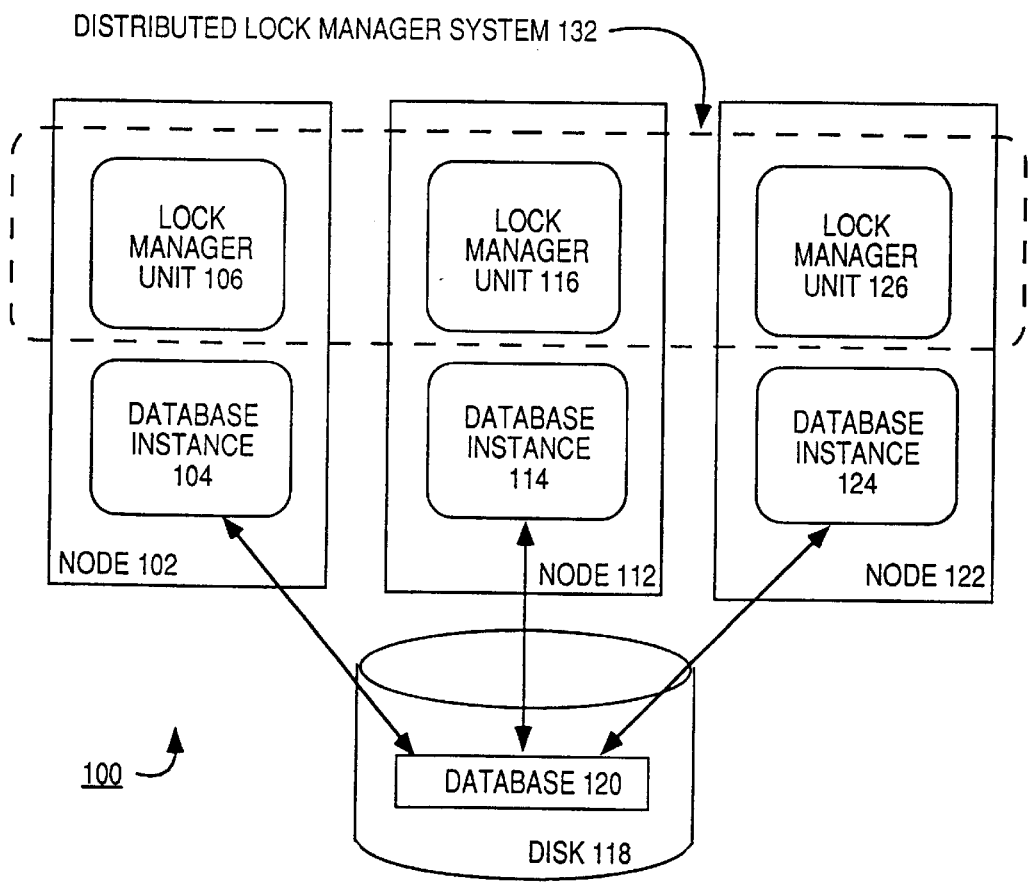
FIG. 1 is a block diagram of a multi-node computer system on which the invention may be implemented.
Figure 2A:
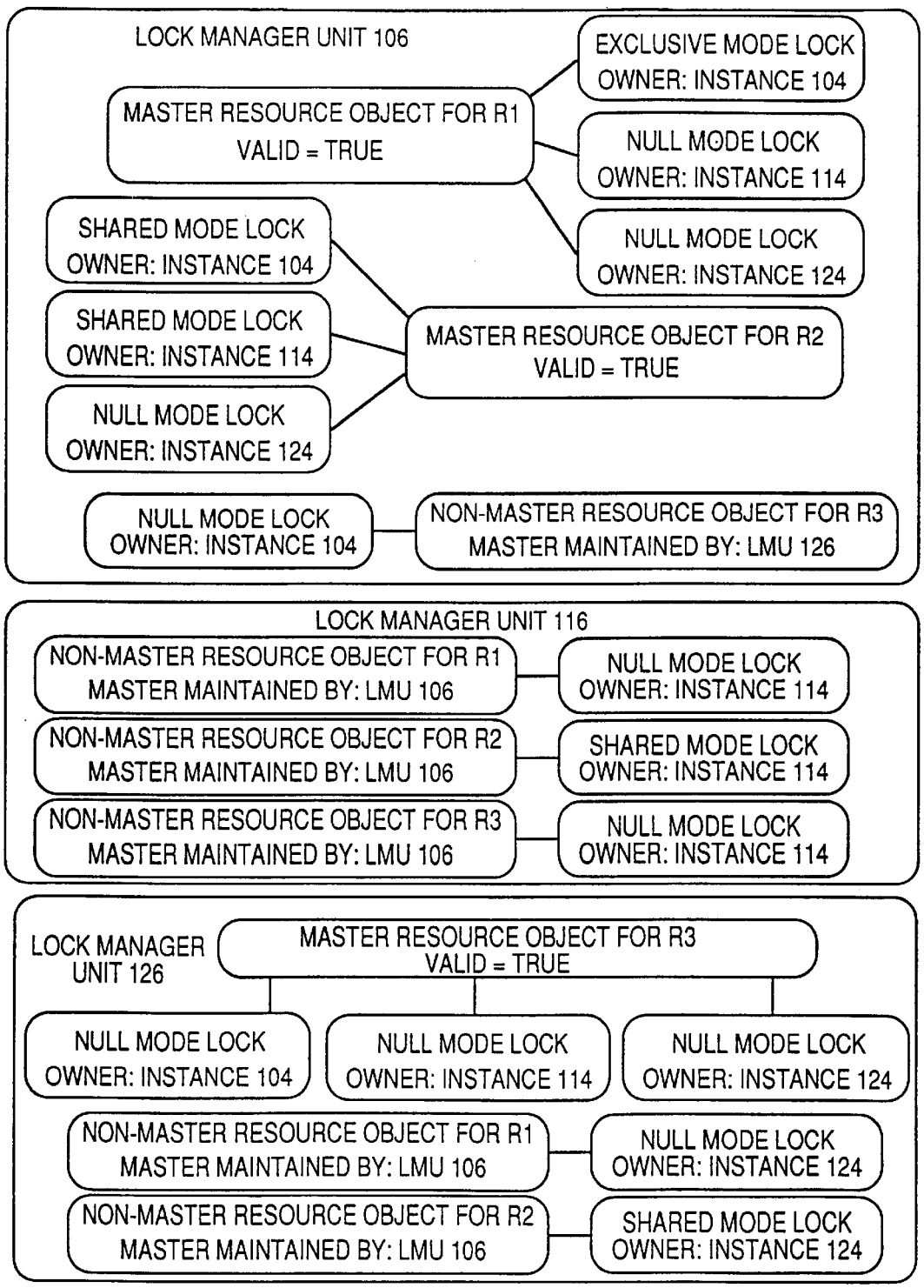
FIG. 2A is a block diagram of a lock management system that requires all lock management units to store data structures for all resources.
Figure 2B:
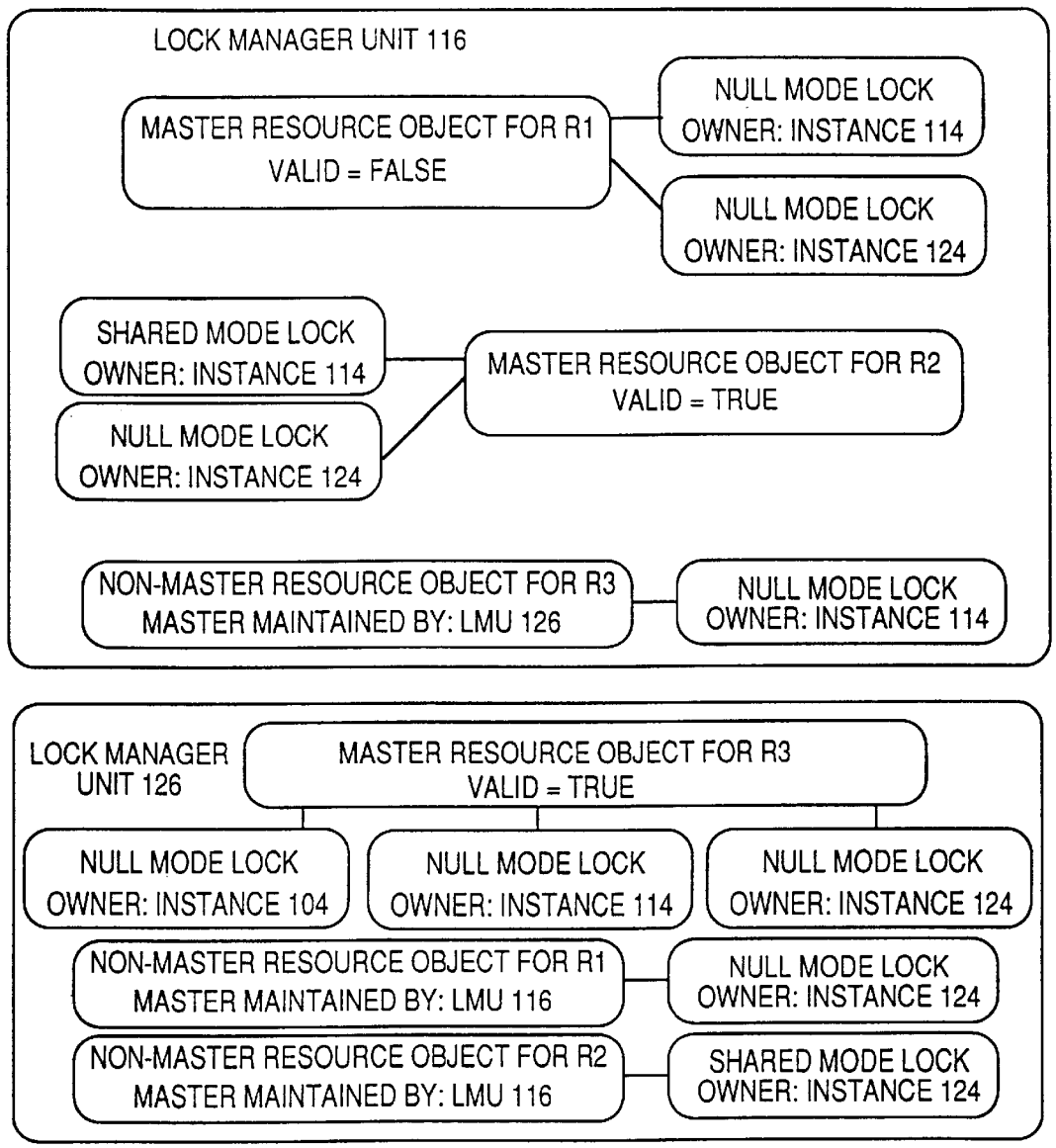
FIG. 2B is a block diagram of the lock management system of FIG. 2A after the failure of a node.

The distributed lock management system 300 differs from the distributed lock management system 132 of FIGS. 1 and 2 in a variety of fundamental ways. First, distributed lock management system 300 only creates a resource object for a resource when a database instance requires access to the resource. For example, none of the database instances require access to resource R3, so none of the lock manager units 306, 316 and 326 need to store a master resource object for resource R3. It may be assumed, therefore, that no locks have been granted on any resource for which no resource object has been created.

Typically, only a small fraction of the resources available in a large database system are being used at any given moment. Some resources may remain unused for months or even years. Because the lock management system 300 creates and manages resource objects for only resources that are actually being used, the overhead associated with lock management system 300 is significantly smaller than the overhead of a lock manager that stores data structures for every possible resource in the system. Because of the reduced overhead, it is possible to use lock management system 300 with fine granularity locks in large systems where it would be virtually impossible to represent every resource of the system in every node on the system.

Lock management system 300 also differs from lock management system 132 in that every database instance does not have to hold a lock on every resource. Rather, each database instance only needs to hold locks that grant the database instance the access rights it requires. Thus, null mode locks, which do not grant any access rights but serve only as "placeholders", are not necessary. In the illustrated example, database instance 124 does not currently require access to any resources. Consequently, database instance 124 does not hold any locks (as is evident by the absence of locks in lock manager unit 326).

RECOVERY DOMAINS

A third difference between lock management system 132 and lock management system 300 is that all resources in the database are grouped into "recovery domains". A recovery domain is a set of one or more resources grouped together for recovery purposes, as shall be described in greater detail below. Each resource belongs to a specific recovery domain, whether or not lock management system 300 has created a resource object for the resource.

The correlation between resources and recovery domains may be established by a set of policies. For example, in one embodiment of the invention, each database has a single recovery domain, and all resources within a database belong to the recovery domain of the database. According to another embodiment, a database may be divided into numerous partitions, where each partition has its own recovery domain and all resources within a partition belong to the recovery domain of the partition. The present invention is not limited to any particular policies for assigning resources to recovery domains.

Each database instance knows the policies that determine which recovery domain corresponds to the resources to which it may require access. Consequently, each instance is able to specify the recovery domain that corresponds to a resource when the instance is requesting a lock on the resource, as shall be described hereafter.

Within lock management system 300, resource objects are grouped according to the recovery domain to which they belong. According to one embodiment, this may be performed by creating recovery domain objects and linking to each recovery domain object the resource objects that belong to the particular recovery domain represented by the recovery domain object. In the illustrated example, resources R1 and R2 belong to recovery domain 1. Therefore, within lock management system 300, the resource objects for R1 and R2 are attached to a recovery domain object for recovery domain 1.

Each recovery domain object has a VALID flag and a list of lock manager units. Specifically, for each recovery domain that a lock manager unit supports, the lock manager unit maintains a list of the other lock manager units that also support the recovery domain. In the illustrated example, lock manager units 306, 316 and 326 support recovery domain 1. Consequently, lock manager unit 306 stores data indicating that lock manager units 316 and 326 support recovery domain 1, lock manager unit 316 maintains data indicating that lock manager units 306 and 326 support recovery domain 1, and lock manager unit 326 maintains data indicating that lock manager units 306 and 316 support recovery domain 1.

RECOVERY DOMAIN CREATION

Initially, each lock manager unit explicitly creates a recovery domain object for the recovery domains it will support. Creating a recovery domain object in a lock manager unit may be performed by the steps illustrated in FIG. 6.

Figure 6:
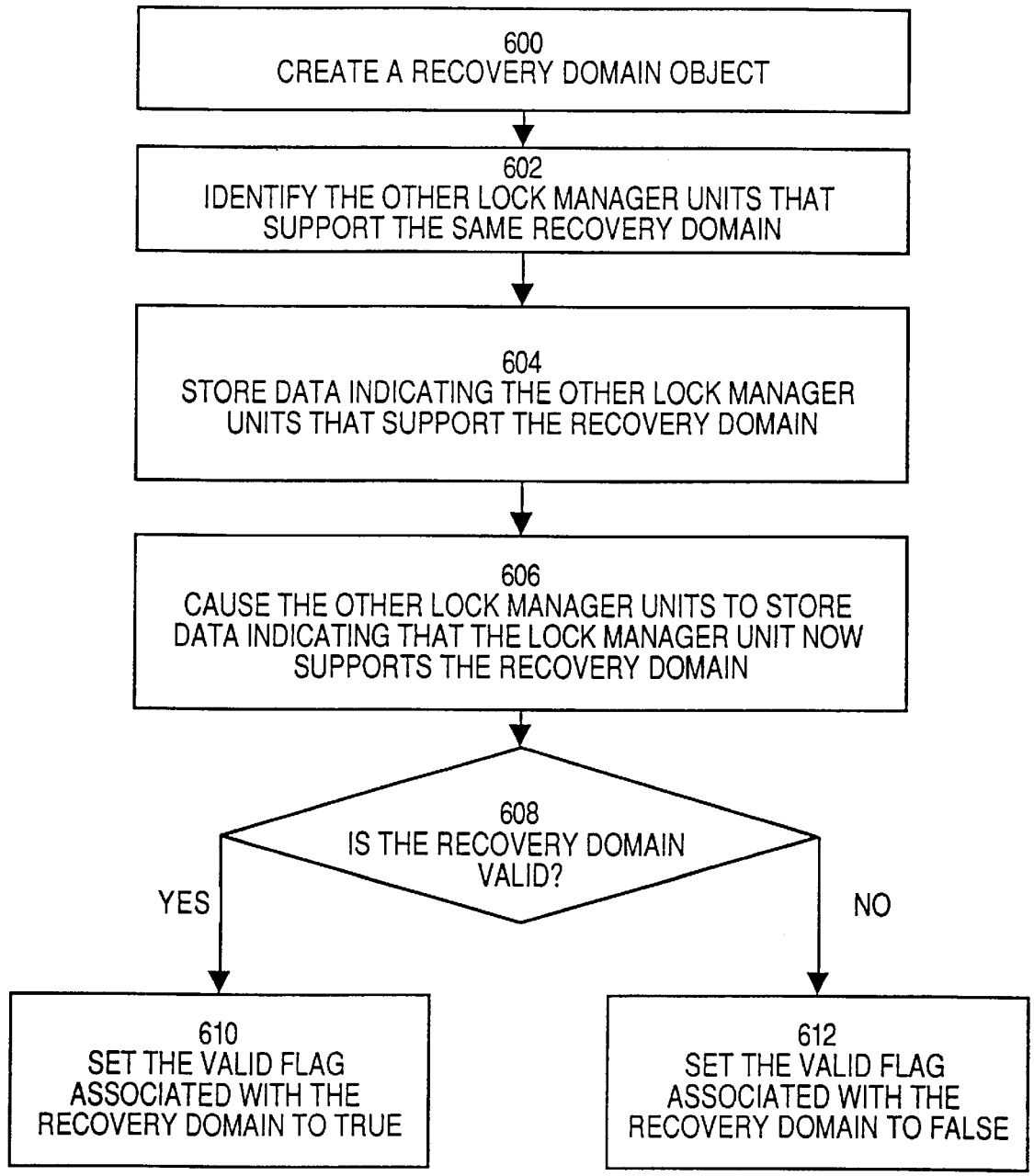
FIG. 6 is a flow chart illustrating steps for creating a recovery domain object in a lock manager unit according to one embodiment of the invention.

Referring to FIG. 6, at step 600, a new recovery domain object is allocated within the lock manager unit. At step 602, the lock manager unit identifies the other lock manager units that already have a recovery domain object for the specified recovery domain. At step 604, the lock manager unit stores a list of the other lock manager units that support the recovery domain. At step 606, the other lock manager units that support the recovery domain store data indicating that the lock manager unit now supports the recovery domain.

At step 608, the lock manager unit determines whether the recovery domain is currently valid. The validity of the recovery domain may be determined based on the VALID flags of recovery domain objects within the lock manager units that already support the recovery domain. If the recovery domain is valid, then the VALID flag of the recovery domain object is set to TRUE at step 610. If the recovery domain is not valid, then the VALID flag of the recovery domain object is set to FALSE at step 612.

RESOURCE INVALIDATION AFTER NODE FAILURE

Figure 4:
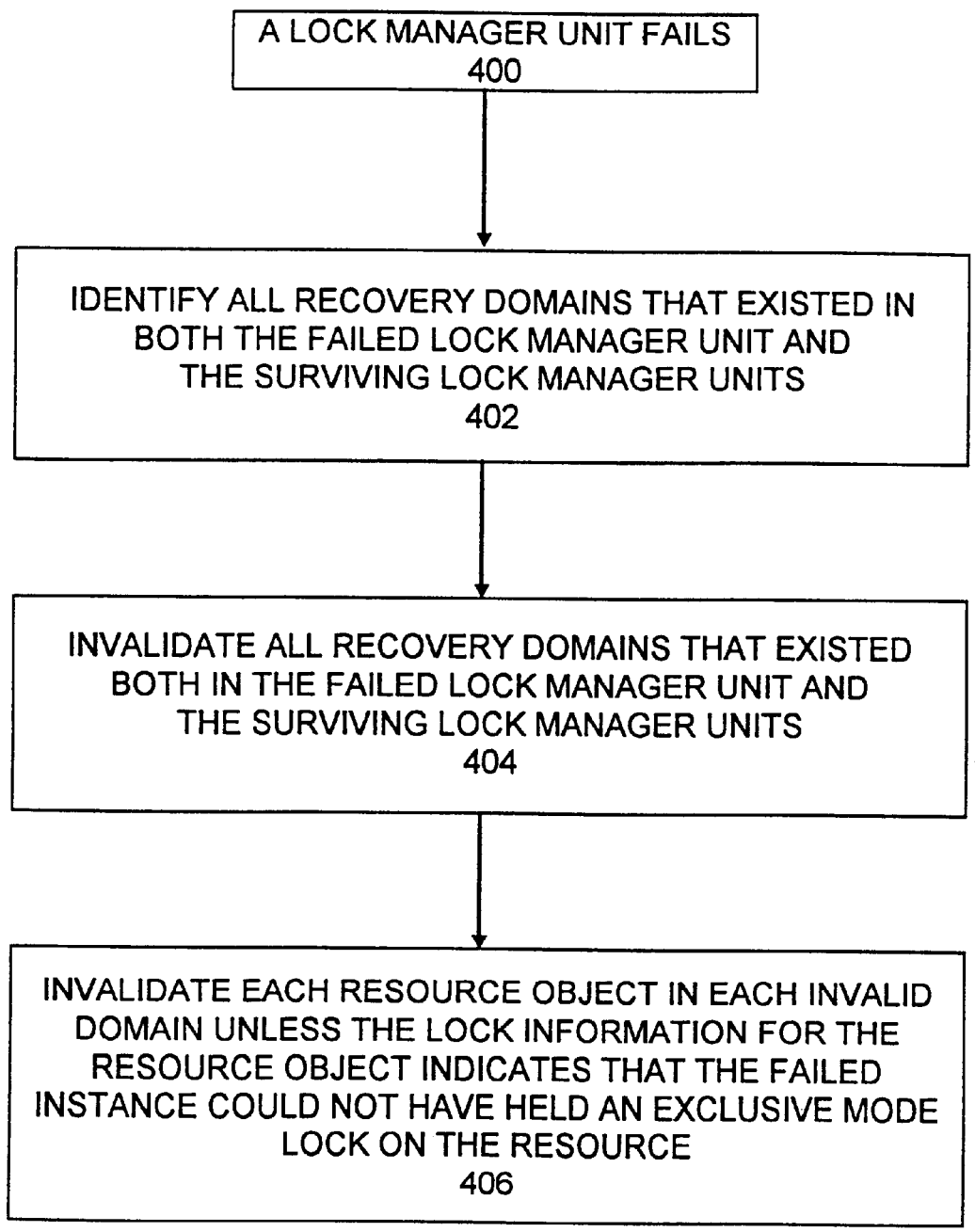
FIG. 4 is

FIG. 4 is a flow chart illustrating steps performed by lock management system 300 in response to the failure of a node. When a node fails, the lock manager unit on the node also fails (step 400). As with the lock management system 132, the information stored in a lock manager unit of lock management system 300 is lost when the node on which the lock manager unit resides fails. Unlike lock management system 132, a lock manager unit of lock management system 300 may contain resource objects about which the other lock manager units have no knowledge. For example, if lock manager unit 306 crashes, lock manager units 316 and 326 will not know that lock manager unit 306 had contained a master resource object for resource R1, nor that instance 104 had been granted an exclusive mode lock on the resource.

However, based on the information contained in the remaining lock manager units, it will be possible to determine which recovery domains were supported by both the failed lock manager unit and surviving lock manager units (step 402). For example, if lock manager unit 306 fails, lock manager units 316 and 326 will know that recovery domain 1 resided in lock manager unit 306. Thus, while it would not be possible to determine the specific lock information that was stored in lock manager unit 306, it is possible to determine that lock manager unit 306 stored some information about locks on resources that belong to recovery domain 1.

Once it is determined which recovery domains resided in a failed lock manager unit, all of the remaining lock manager units mark those recovery domains as invalid (step 404). This may be performed in the embodiment illustrated in FIG. 3 by setting the VALID flag associated with recovery domain R1 within lock manager units 316 and 326 to FALSE.

Setting the valid flag associated with a recovery domain to FALSE does not automatically invalidate all resources within the recovery domain. Specifically, if the lock information stored in a lock manager unit would not have prevented the failed instance from holding an exclusive lock on a resource that belongs to the invalid domain, then the resource object for that resource is marked invalid (step 406). On the other hand, if a lock manager unit contains lock information that would have made it impossible for the failed instance to have had an exclusive lock on a particular resource, then the resource object associated with that resource remains valid even though the resource domain in which it resides is marked invalid.

For example, after the failure of lock manager unit 306, lock manager unit 316 would mark recovery domain 1 as invalid. However, lock manager unit 316 would not mark the resource object for resource R2 as invalid. Resource R2 would remain valid because lock manager unit 316 knows that instance 104 could not have held an exclusive mode lock on resource R2 because database instance 114 holds a shared mode lock on resource R2, and an exclusive mode lock would have conflicted with the shared mode lock.

It may also be possible to determine that the failed instance did not hold exclusive mode locks on particular resources based on information other than existing lock information. For example, the master resource object allocation policy may put restrictions on which lock manager units can master certain resources. All resources which could not have been mastered at the failed lock manager unit are considered VALID whether or not any resource objects have actually been created for such resources.

RESOURCE INVALIDATION AFTER INSTANCE FAILURE

Under certain circumstances, the lock manager unit associated with a database instance may remain intact when the database instance fails. When this occurs, no lock information is lost. Therefore, it is not necessary to invalidate the entire recovery domains in which the failed database instance may have held exclusive mode locks. Rather, resource objects are invalidated on a resource by resource basis depending on whether the failed instance actually held an exclusive mode lock on the resource.

LOCK REQUEST HANDLING

Each invalid resource may have to be cleaned up before it may be accessed. Invalid resources include resources that are marked invalid, and resources for which a resource object does not currently exist that belong to an invalid recovery domain. According to one embodiment of the invention, cleanup operations are performed in response to requests for locks on invalid resources.

Figure 5:
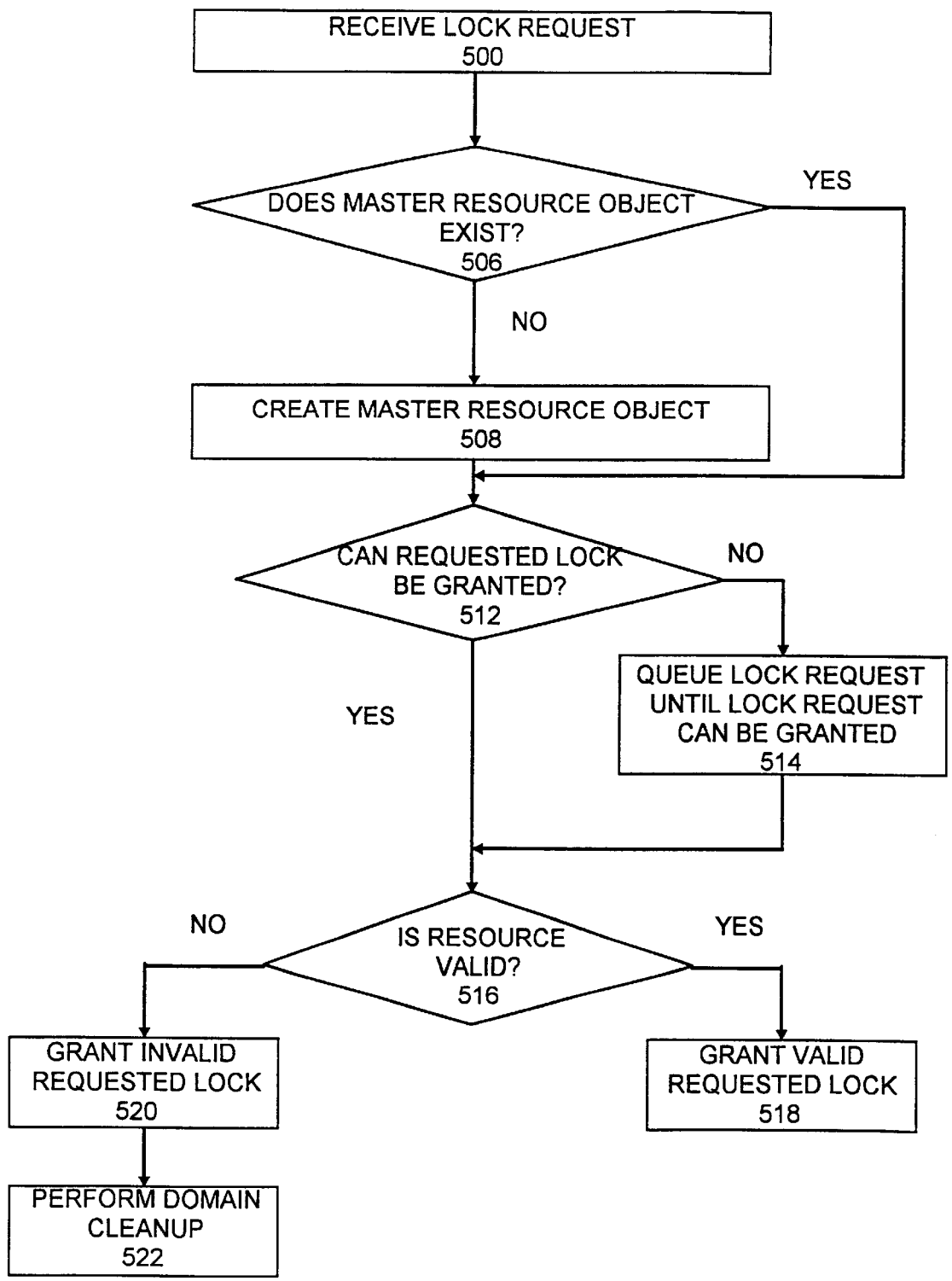
FIG. 5 is a flow chart illustrating the steps performed by the distributed lock management system of FIG. 3 in response to receiving a lock request on a resource.

FIG. 5 is a flow chart illustrating the steps performed by distributed lock management system 300 in response to receiving a lock request on a resource. Referring to FIG. 5, when an instance requires a lock on a resource, the instance requests the lock from the lock manager unit that resides on the same node as the instance (the "local lock manager unit"). The request contains data identifying (1) the lock mode requested, (2) the resource, and (3) the recovery domain to which the resource belongs.

If the local lock manager unit has not been assigned to be the master lock manager unit for the resource, then the local lock manager unit sends the request to the lock manager unit that is serving as master for the resource. If the local lock manager unit does not know which lock manager unit is mastering the resource, then the local lock manager unit sends the lock request to a director lock manager unit for the resource. The director lock manager unit of a resource is a lock manager unit associated with the resource by a fixed, resource name-to-lock manager unit mapping. Thus, the director lock manager for any resource may be determined by the local lock manager unit based on the mapping and the name of the resource.

When the director lock manager unit receives the lock request, the director lock management unit determines whether a master lock manager unit has already been assigned for the resource specified in the lock request. If a master lock manager unit has already been assigned, the director lock manager forwards the request to the master lock manager unit.

If a master lock manager unit has not yet been assigned, then the director lock manager unit assigns a lock manager unit to master the resource. According to one embodiment, the director lock manager unit assigns itself to be the master lock manager unit for the resource. According to an alternative embodiment, the director lock manager unit assigns the local lock manager unit to be the master lock manager unit for the resource. Other embodiments may use other factors to determine which lock manager unit will master a particular resource. If the director lock manager unit assigns another lock manager unit to be the master lock manager unit for the resource, the director lock manager unit forwards the lock request to the selected master lock manager unit.

In step 500, the master lock manager unit receives the request. At step 506, the master lock manger unit determines whether a master resource object for the specified resource already exists. If a master resource object for the resource does not already exist, then the master lock manager unit creates a master resource object for the resource (step 508). The master resource object is then linked to the recovery domain object to which it belongs. Upon creating a master resource object, the VALID flag associated with the master resource object is set to the value of VALID flag of the recovery domain object to which it belongs.

If the local lock manager unit is not the master lock manager unit, then the local lock manager unit creates a non-master resource object for the resource if one does not already exist in the local lock manager unit. Similar to the master resource object, a non-master resource object is linked to the appropriate recovery domain object. The VALID flag of the non-master resource object is set based on the value of the VALID flag of the master resource object.

At step 512, the lock manager unit that manages the master resource object for the resource determines whether the requested lock can be granted. If the lock cannot be granted, then the lock request is queued (step 514) until it can be granted.

At step 516, it is determined whether the specified resource is valid. If the specified resource is not valid, then an invalid lock is granted at step 520. If the specified resource is valid, then a valid lock is granted at step 518. When a lock is granted, the lock is attached to the master resource object. If the master resource object does not reside in the local lock manager unit, a lock is also attached to the appropriate non-master resource object that resides in the local lock manager unit. The database instance that requested the lock is then notified that the lock has been granted, and whether the granted lock is valid or invalid.

If the lock was granted on an invalid resource, then the database instance that requested the lock cannot use the resource until a cleanup operation is performed. At step 522, a cleanup operation is performed on the invalid domain to which the invalid resource belongs. The domain cleanup process is described in greater detail below.

DOMAIN CLEANUP

According to one embodiment of the invention, the database instance that requested the lock on the invalid resource (the "requesting instance") performs the recovery of the failed instance. Specifically, the local lock manager unit notifies the requesting instance that the specified resource is invalid. The requesting instance then performs the necessary cleanup on the resources that were held by the failed instance. Typically, such cleanup involves redoing changes that had not yet been written from volatile memory of the crashed node to the database before the crash, and removing from the database any changes made by transactions within the failed instance that had not committed at the time the instance failed.

According to one embodiment, the requesting instance performs recovery on all resources that were exclusively held by the crashed instance. After the requesting instance has performed the appropriate cleanup operations, the requesting instance sends a message to the local lock manager unit indicating that the cleanup has been completed. However, during the time it takes for the requesting instance to perform the cleanup, additional events may have occurred which affect the validity of resources. For example, another lock manager unit may have failed, potentially invalidating some of the resources that were valid at the time the requesting instance began the recovery operation. Consequently, the lock management system cannot simply validate all invalid resources when the requesting instance has finished its recovery operations.

SNAPSHOT IDENTIFIERS

According to one embodiment of the invention, the lock management system 300 generates a snapshot of the current state of the resources it is managing. The snapshot includes at least an indication of the invalid resources for which resource objects currently exist. The lock management system 300 also creates a snapshot identifier that uniquely identifies the snapshot. Before the requesting instance begins recovery, the local lock manager transmits the snapshot identifier to the requesting instance.

After receiving the snapshot, the requesting instance then proceeds with recovery operations. Various recovery techniques may be used. The present invention is not limited to any particular type of recovery techniques. When the requesting instance has completed recovery operations, the requesting instance sends back to the local lock manager unit the snapshot identifier. Based on the snapshot identified by the snapshot identifier, the local lock manager unit is able to determine exactly which resources were cleaned up by the requesting process and therefore which VALID flags can be set back to TRUE.

When the local lock manager receives the recovery completion message and the accompanying snapshot identifier from the requesting instance, the local lock manager updates the VALID flags of its resource objects as appropriate. In addition, the local lock manager sends messages to the other lock manager units to indicate which resources have been cleaned up. The other lock manager units update the VALID flags of their resource objects accordingly. If no other event has occurred that would invalidate the resource domain, the VALID flag of the resource domain is set to TRUE. If no other event has occurred that would invalidate the resource on which the lock was requested, the requesting instance may proceed to access the resource.

Various techniques may be used to implement the snapshot mechanism described above. For example, every resource object may include an attribute for storing a snapshot number. When a resource object is created, the snapshot number attribute of the resource object is set to the current value of a global counter. The value of the counter is incremented when a failure occurs within the database system.

Before the requesting instance begins recovery after a failure, the value of the global counter after the failure is sent to the process as the snapshot identifier. When the process completes recovery, the VALID flags of all of the resource objects with snapshot number attributes equal to or less than the snapshot identifier that is passed back from the requesting instance are set to true. This technique validates all resource objects that were made invalid by the most recent failure and any previous failures, including invalid resource objects created after the recovery process began, but before any subsequent failure occurred. The only invalid resources that would not be validated are those resources that became invalid after a subsequent failure which would have snapshot number attributes that are greater than the snapshot identifier.

It should be noted that lock manager unit can manage access to some types of resources using the techniques described herein while managing access to other types of resources using conventional techniques that require all database instances to hold at least a null mode lock on all resources. For example, one embodiment of the invention uses recovery domains to manage buffer cache locks, while other types of locks are managed using conventional techniques.

In the foregoing specification, the invention has been described with reference to specific embodiments thereof. It will, however, be evident that various modifications and changes may be made thereto without departing from the broader spirit and scope of the invention. The specification and drawings are, accordingly, to be regarded in an illustrative rather than a restrictive sense.

What is claimed is:

1. A computer system comprising:
a plurality of nodes;
a plurality of resources located on one or more of said plurality of nodes;
a lock management system that resides on said plurality of nodes;
said lock management system being configured to manage all locks that grant rights to access said plurality of resources;
one or more processes located on said plurality of nodes, each of said one or more processes sending to said lock management system a request for a lock which grant rights to access a resource of said plurality of resources before accessing said resource; and
the lock management system storing resource objects and lock information for only those resources of said plurality of resources for which locks have been requested by said one or more processes.

2. The computer system of claim 1 wherein:
each of said plurality of resources belongs to a recovery domain; and
each resource object in the lock management system is linked to a recovery domain object that represents the recovery domain associated with the resource represented by the resource object.

3. The computer system of claim 2 wherein:
the lock management system includes a plurality of lock manager units; and
each lock manager unit that has a recovery domain object for a particular recovery domain stores data indicating the other lock manager units that store recovery domain objects for the particular recovery domain.

4. The computer system of claim 2 wherein:
each recovery domain object includes a flag that indicates the validity of the recovery domain; and
each lock manager unit is configured to set the flag of a recovery domain object to indicate that the recovery domain is invalid in response to detecting the failure of another lock manager unit that supports the recovery domain.

5. The computer system of claim 1 wherein:
the lock management system is configured to respond to a request for a lock on an invalid resource by generating a snapshot of the lock information managed by the lock management system, and
a snapshot identifier that identifies the snapshot;
the lock management system sends the snapshot identifier to a cleanup process;
the cleanup process sends the snapshot identifier back to the lock management system after cleanup has been performed; and
in response to receiving the snapshot identifier from the cleanup process, the lock management system updates the lock information based on the snapshot identified by the snapshot identifier.

6. The computer system of claim 1 wherein the lock management system is configured to create a master resource object for any of said plurality of resources only in response to receiving a request for a lock on a resource for which a master resource object does not already exist.

7. The computer system of claim 1 wherein:
the lock management system includes a plurality of lock manager units; and
a resource that is represented by a resource object in one lock manager unit is not represented by any resource object in another lock manager unit.

8. The computer system of claim 1 wherein the lock management system does not store any resource objects for a subset of said plurality of resources, said subset includes all resources for which locks have not been requested by said one or more processes.

9. The computer system of claim 7 wherein in response to a lock manager unit receiving a request for a lock on a resource for which a resource object does not exist, the lock manager unit creates a master resource object for the resource but no other lock manager unit creates any resource object for the resource.

10. A method for recovering after failure of a database process, the method comprising the steps of:
    establishing a snapshot of lock information stored in a lock management system;
    creating a snapshot identifier that identifies the snapshot;
    sending the snapshot identifier to a cleanup process;
    after receiving said snapshot identifier, said cleanup process performing cleanup of resources held by said database process;
    after performing the cleanup of the resources held by the database process, the cleanup process transmitting the snapshot identifier to the lock manager system;
    the lock management system determining which resources have been cleaned up by said cleanup process based on the snapshot identified by said snapshot identifier; and
    the lock management system revising said lock information to indicate which resources have been cleaned up by said cleanup process.

11. The method of claim 10 wherein:
    the step of establishing a snapshot is performed in response to receiving a request for an invalid resource; and
    the step of performing cleanup is performed by a process that issued the request for the invalid resource.

12. A method for managing locks that are associated with a plurality of resources that are located on one or more of a plurality of nodes, comprising the steps of:
    configuring a lock management system, that resides on said plurality of nodes, to manage all locks that grant rights to access said plurality of resources;
    for one or more processes located on said plurality of nodes, each of said one or more processes sending to said lock management system a request for a lock which grant rights to access a resource of said plurality of resources before accessing said resource; and
    said lock management system storing resource objects and lock information for only those resources of said plurality of resources for which locks have been requested by said one or more processes.

13. The method of claim 12 wherein:
    each of said plurality of resources belongs to a recovery domain; and
    each resource object in the lock management system is linked to a recovery domain object that represents the recovery domain associated with the resource represented by the resource object.

14. The method of claim 13 wherein:
    the lock management system includes a plurality of lock manager units; and
    each lock manager unit that has a recovery domain object for a particular recovery domain stores data indicating the other lock manager units that store recovery domain objects for the particular recovery domain.

15. The method of claim 13 wherein:
    each recovery domain object includes a flag that indicates the validity of the recovery domain; and
    each lock manager unit is configured to set the flag of a recovery domain object to indicate that the recovery domain is invalid in response to detecting the failure of another lock manager unit that supports the recovery domain.

16. The method of claim 12 wherein:
    the lock management system is configured to respond to a request for a lock on an invalid resource by generating
    a snapshot of the lock information managed by the lock management system, and
    a snapshot identifier that identifies the snapshot;
    the lock management system sends the snapshot identifier to a cleanup process;
    the cleanup process sends the snapshot identifier back to the lock management system after cleanup has been performed; and
    in response to receiving the snapshot identifier from the cleanup process, the lock management updates the lock information based on the snapshot identified by the snapshot identifier.

17. The method of claim 12 wherein the lock management system is configured to create a master resource object for any of said plurality of resources only in response to receiving a request for a lock on a resource for which a master resource object does not already exist.

18. The method of claim 12 wherein:
    the lock management system includes a plurality of lock manager units; and
    a resource that is represented by a resource object in one lock manager unit is not represented by any resource object in another lock manager unit is not represented by any resource object in another lock manager unit.

19. The method of claim 12 wherein the lock management system does not store any resource objects for a subset of said plurality of resources, said subset includes all resources for which locks have not been requested by said one or more processes.

20. The method of claim 18 wherein in response to a lock manager unit receiving a request for a lock on a resource for which a resource object does not exist, the lock manager unit creates a master resource object for the resource but no other lock manager unit creates any resource object for the resource.

21. A machine-readable medium carrying one or more sequences of instructions for managing locks that are associated with a plurality of resources that are located on one or more of a plurality of nodes, wherein execution of the one or more sequences of instructions by one oe more processors causes the one or more processors to perform the steps of:
    configuring a lock management system, that resides on said plurality of nodes, to manage all locks that grant rights to access said plurality of resources;
    for one or more processes located on said plurality of nodes, each of said one or more processes sending to said lock management system a request for a lock which grant rights to access a resource of said plurality of resources before accessing said resource; and
    configuring said lock management system to store resource objects and lock information for only those resources of said plurality of resources for which locks have been requested by said one or more processes.

22. The machine-readable medium of claim 21, further comprising instructions for performing the steps of:
    configuring each of said plurality of resources to belong to a recovery domain; and
    configuring each resource object in the lock management system to link to a recovery domain object that represents the recovery domain associated with the resource represented by the resource object.

23. The machine-readable medium of claim 21, further comprising instructions for performing the steps of:
   configuring the lock management system to respond to a request for a lock on an invalid resource by generating
      a snapshot of the lock information managed by the lock management system, and
      a snapshot identifier that identifies the snapshot;
   configuring the lock management system to send the snapshot identifier to a cleanup process;
   configuring the cleanup process to send the snapshot identifier back to the lock management system after cleanup has been performed; and
   configuring the lock management system to update the lock information based on the snapshot identified by the snapshot identifier in response to receiving the snapshot identifier from the cleanup process.

24. The machine-readable medium of claim 21, further comprising instructions for performing the steps of configuring the lock management system to create a master resource object for any of said plurality of resources only in response to receiving a request for a lock on a resource for which a master resource object does not already exist.

25. The machine-readable medium of claim 21, further comprising instructions for performing the steps of:
   configuring the lock management system includes a plurality of lock manager units; and
   wherein a resource that is represented by a resource object in one lock manager unit is not represented by any resource object in another lock manager unit.

26. The machine-readable medium of claim 21 further comprising instructions for performing the steps of configuring the lock management system to not store any resource objects for a subset of said plurality of resources, wherein subset includes all resources for which locks have not been requested by said one or more processes.

27. A machine-readable medium carrying one or more sequences of instructions for recovering after failure of a database process, wherein execution of the one or more sequences of instructions by one or more processors causes the one or more processors to perform the steps of:
   establishing a snapshot of lock information stored in a lock management system;
   creating a snapshot identifier that identifies the shapshot;
   sending the snapshot identifier to a cleanup process;
   after receiving said snapshot identifier, said cleanup process performing cleanup of resources held by said database process;
   after performing the cleanup of the resources held by the database process, the cleanup process transmitting the snapshot identifier to the lock manager system;
   the lock management system determining which resources have been cleaned up by said cleanup process based on the snapshot identified by said snapshot identifier; and
   the lock management system revising said lock information to indicate which resources have been cleaned up by said cleanup process.

28. The machine-readable medium of claim 27 wherein:
   the step of establishing a snapshot is performed in response to receiving a request for an invalid resource; and
   the step of performing cleanup is performed by a process that issued the request for the invaild resource.

* * * * *

UNITED STATES PATENT AND TRADEMARK OFFICE
CERTIFICATE OF CORRECTION

PATENT NO. : 6,385,613 B1
DATED : May 7, 2002
INVENTOR(S) : Grewell et al.

It is certified that error appears in the above-identified patent and that said Letters Patent is hereby corrected as shown below:

Column 14,
Line 17, replace "management updates" with -- management system upates --.

Column 16,
Line 33, replace "invaild" with -- invalid --.

Signed and Sealed this

Twenty-fourth Day of September, 2002

Attest:

Attesting Officer

JAMES E. ROGAN
Director of the United States Patent and Trademark Office